Dec. 1, 1970   P. C. CAMERON   3,544,195
ANTIGLARE REARVIEW MIRROR
Filed May 3, 1965

INVENTOR
PETER C. CAMERON 3,544,195
ANTIGLARE REARVIEW MIRROR
Peter C. Cameron, 6625 River Road,
Bethesda, Md. 20034
Filed May 3, 1965, Ser. No. 452,495
Int. Cl. G02b 27/78
U.S. Cl. 350—156                      2 Claims

ABSTRACT OF THE DISCLOSURE

A vehicle antiglare rearview mirror comprising a front partially reflective mirror, a rear full reflective mirror and an interposed circularly polarized layer which allows light received through the partial mirror to pass in a helical path to the full mirror and then obstructs the reflected light which is in a reversed helical path.

---

Figure 1:
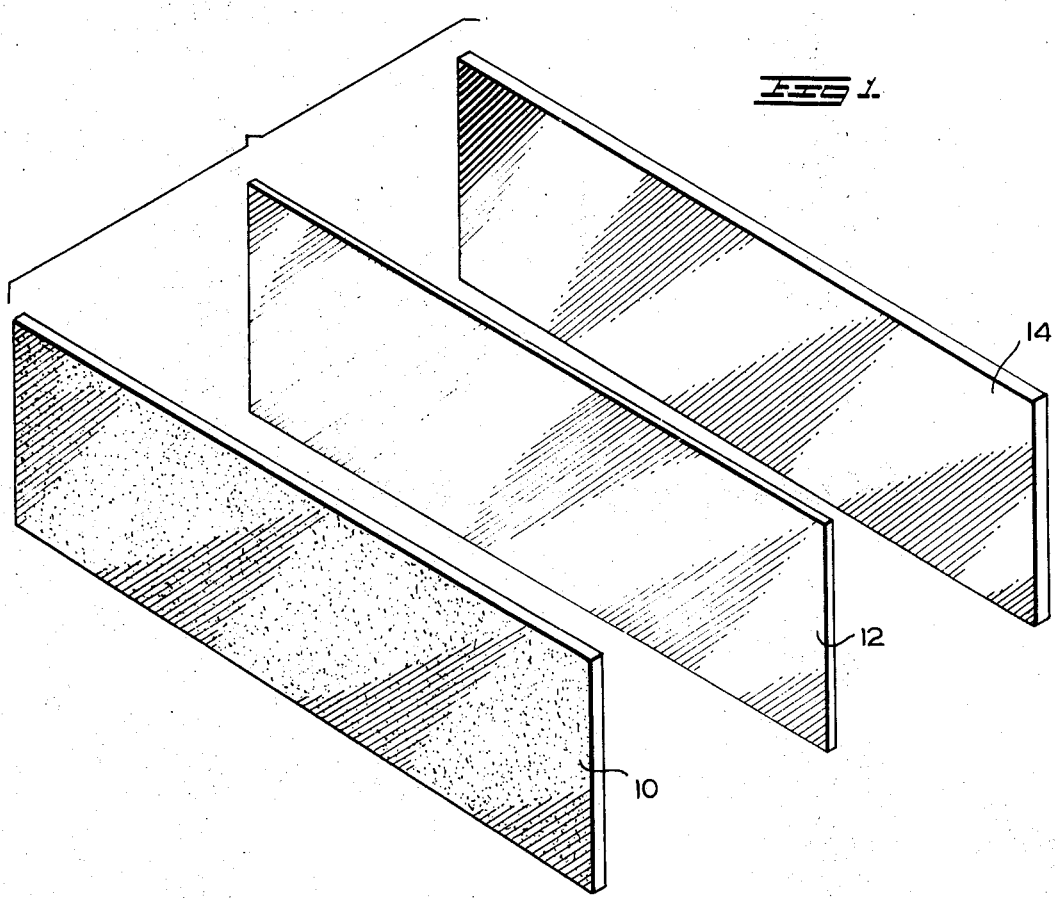

This invention relates to improvements in vehicle antiglare rearview mirrors and is concerned more particularly with devices which provide adequate day time and night time vision yet which avoid the annoying and dangerous glare from the headlights of following vehicles.

The glare problem with rearview vehicle mirrors has long been known to exist and many efforts have heretofore been made to alleviate it. Such prior efforts have involved the use of filters or by prismatically displacing the reflected image to reduce the degree of reflectance. Others have employed partially silvered or partially reflective mirrors with opaque backings in an attempt to absorb the excess light which passes through the partial mirror but a certain degree of reflection and glare still persists. All of such prior devices, however, have been objectionable in one respect or another and in general unsatisfactory in their efforts to accomplish the intended results.

The principal object of the present invention is for the first time to provide a vehicle rearview mirror which in daylight driving possesses all of the normally expected attributes of a mirror but which in nighttime driving effectively avoids the brilliance and glare from the headlights of following vehicles.

Another object is to provide a unitary fixed antiglare rearview mirror which requires no manipulation by the vehicle operator during either day or night conditions.

A more particular object of the invention is to provide a laminated structure composed of a front partially reflective mirror, a rear full reflective mirror and an interposed circularly polarized sheet which allows light received through the partial mirror to pass in a helical path to the full mirror and then traps or cancels the reflected light which is in a reversed helical path.

Other objects and advantages will be apparent from the following detailed description taken in conjunction with the accompanying drawings wherein a preferred embodiment of the principles of the invention has been selected for exemplification.

Figure 2:

In the drawings:

FIG. 1 is an exploded perspective view of a mirror device constructed in accordance with the invention; and FIG. 2 is a longitudinal sectional view of the assembled device of FIG. 1.

Referring more particularly to the drawings, wherein like numerals refer to like parts, 10 designates a front partially silvered or partially reflective mirror, 12 the circularly polarized intermediate sheet or layer and 14 the rear full reflective mirror. The various layers are preferably secured together in any suitable manner in a laminated structure as shown in FIG. 2 but if it is desired for any reason to separate the components, the device would be equally as operative.

The degree of reflectivity of the partial mirror 10 may vary over a wide range in accordance with the devices or needs of various individuals or the conditions to be encountered. However, for most purposes a partial mirror which allows about 40% of light to pass through and which reflects about 60% of the light has been found to produce very satisfactory results.

As is known, the circular polarizer may be made by bonding a sheet of doubly-refracting material to a linear polarized sheet to divide the polarized beam into two beams of equal intensity but with different velocity, one being retarded. The retardation sheet is selected so that the retarded beam is ¼ of a cycle out of phase and the axis of the retardation plate is placed at 45° to the right or left of the polarizer axis so that the circularly polarized beam is a right-hand helix or a left-hand helix. For example, a right-handed beam when reflected from a non-depolarizing surface, such as the full reflective mirror 14, becomes a left-handed beam and thus cannot return through the circular polarizer 12.

The rear full reflective mirror may be of the usual silvered glass or a thin metal reflective plate or foil may be employed to increase compactness of the device without any loss of efficiency.

It will thus be apparent that the light which passes through the front partial mirror 10 is completely extinguished and that there is complete absence of glare or secondary reflection from the rear of the partial mirror 10. In contrast, the same partial mirror with a black opaque rear coating, for example, would produce secondary reflection of up to about 10% and in many cases double images particularly when light is beamed at a side angle to the mirror.

There may be in the use of the device of the invention in night driving under some conditions the appearance of a halo adjacent to the image of the reflection of the following headlight but such halo varies with the distance of the following vehicle and serves as a very useful indication of actual distance.

The various components 10, 12 and 14 may, of course, be of rectangular shape as shown, oval, circular or of any other configuration appropriate to the intended use of the device.

It is to be understood that the present invention is not confined to the particular device herein illustrated and described but embraces all such modifications thereof as come within the scope of the following claims.

I claim:

1. An antiglare mirror which comprises, a front partially reflecting mirror, said partially reflecting mirror reflecting about 60% of incident light, a circular polarizer rearwardly of said front mirror, said circular polarizer changing the transmitted light through said partially reflecting mirror to circularly polarize light of a given handedness, and a substantially fully reflecting mirror rearwardly of said circular polarizer, said substantially fully reflecting mirror reflecting said circularly polarized light and changing said handedness to the opposite handedness of said circularly polarized light such that said oppositely handed circularly polarized light is substantially extinguished by said circular polarizer.

2. The method of diminishing light glare from the headlights of a following vehicle which comprises, intercepting said light by a partial reflecting mirror whereby to reflect about 60% of said light to produce an image and to pass the remaining portion of said light rearwardly of said partially reflecting mirror, twisting said passed light into a helical beam of a given handedness by a circular polarizer disposed rearwardly of said partially reflecting mirror and reflecting a helical beam of reversed handedness to said circular polarizer whereby substantially to extinguish said passed light.

References Cited

UNITED STATES PATENTS

| | | | |
|---|---|---|---|
| 2,301,126 | 11/1942 | Kriebel | 350—156 |
| 2,367,096 | 1/1945 | Chubb | 350—156 |
| 2,790,350 | 4/1957 | Cameron | 350—278 |
| 1,601,597 | 9/1926 | Peacock | 350—278 |

FOREIGN PATENTS 683,933  11/1939  Germany.

OTHER REFERENCES

Dery, "Controlling Light Behaviour Through Linear, Circular, and Spectrally Selective Polarizers," Manufacturing Optician, vol. 1, No. 6 (March 1964) pp. 268–270.

DAVID SCHONBERG, Primary Examiner

P. R. MILLER, Assistant Examiner

U.S. Cl. X.R.

350—157, 278